(No Model.)  3 Sheets—Sheet 1.

J. C. DAVIDSON.
ELECTRIC MOTOR APPARATUS.

No. 508,000.  Patented Nov. 7, 1893.

WITNESSES  INVENTOR (No Model.) 3 Sheets—Sheet 2.
J. C. DAVIDSON.
ELECTRIC MOTOR APPARATUS.

No. 508,000. Patented Nov. 7, 1893.

WITNESSES:

INVENTOR
John C. Davidson
by Attorney (No Model.)   3 Sheets—Sheet 3.

J. C. DAVIDSON.
ELECTRIC MOTOR APPARATUS.

No. 508,000.   Patented Nov. 7, 1893.

WITNESSES:
Edw. F. Simpson, Jr.
N. D. Feist

INVENTOR
John C. Davidson
by Attorney

UNITED STATES PATENT OFFICE.

JOHN C. DAVIDSON, OF PRINCE'S BAY, NEW YORK, ASSIGNOR TO THE S. S. WHITE DENTAL MANUFACTURING COMPANY, OF PHILADELPHIA, PENNSYLVANIA.

ELECTRIC-MOTOR APPARATUS.

SPECIFICATION forming part of Letters Patent No. 508,000, dated November 7, 1893.

Application filed May 2, 1893. Serial No. 472,810. (No model.)

*To all whom it may concern:*

Be it known that I, JOHN C. DAVIDSON, of Prince's Bay, in the county of Richmond and State of New York, have invented certain new and useful Improvements in Electric-Motor Apparatus, of which the following is a specification.

My invention relates to certain improvements, as hereinafter claimed, applicable to that class of motors intended to develop power or energy from electric currents of high potential.

My object is to transform the high potential current into a current of low potential, and with this latter current to drive a suitable motor which may be placed convenient to the work to be done by it, without danger to life from the transformed or low potential current; also to so connect the fields of a high potential motor and a low potential generator as to as nearly as practicable keep the potential of the low potential generator constant regardless of changes of load and speed; also to guard against shocks from the high potential motor, and provide for safely handling it for adjustment or repairs.

Figure 1:
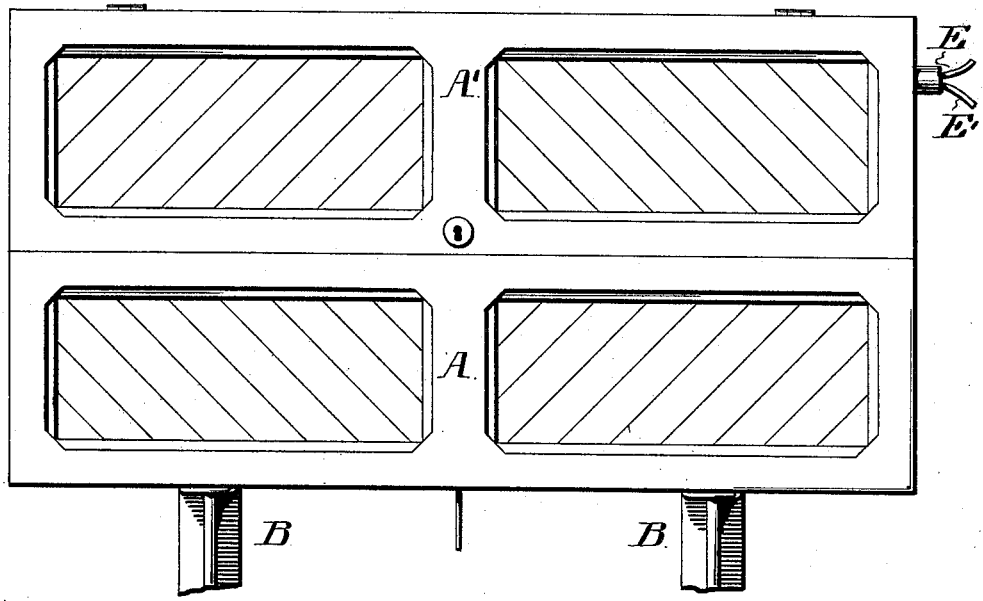
Figure 2:
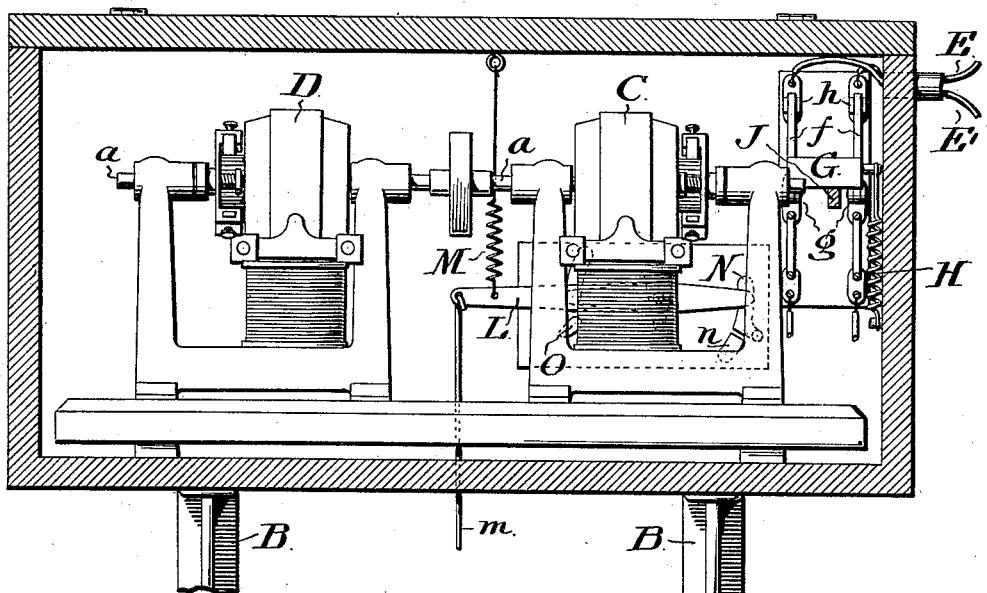
Figure 3:
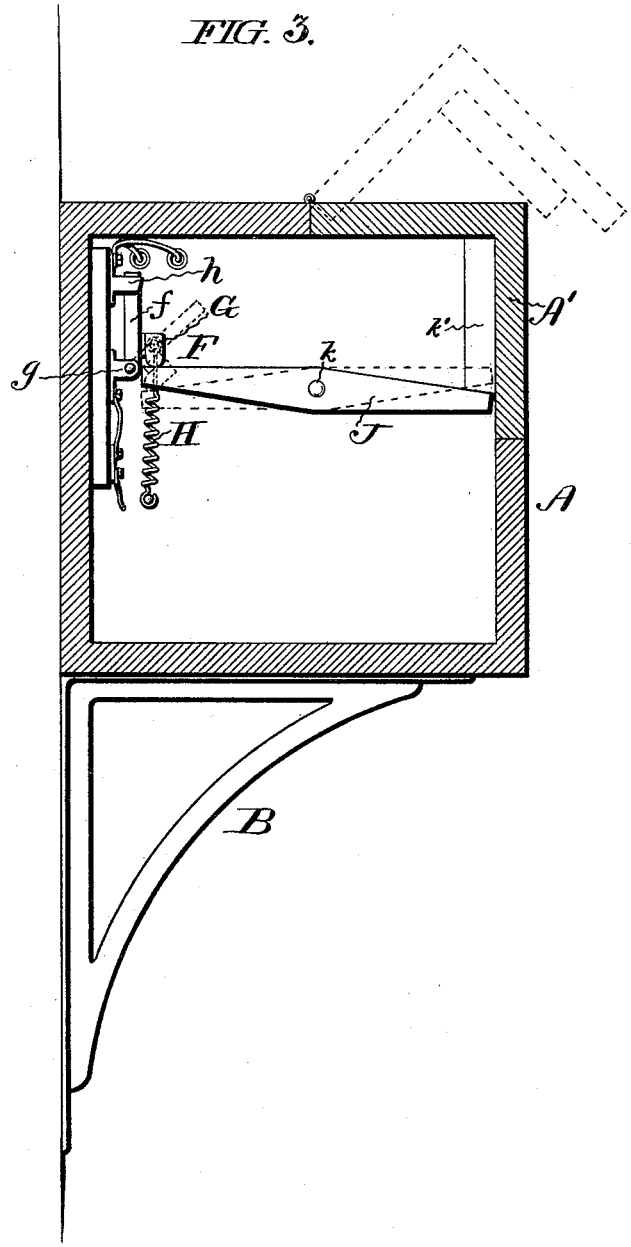
Figure 4:
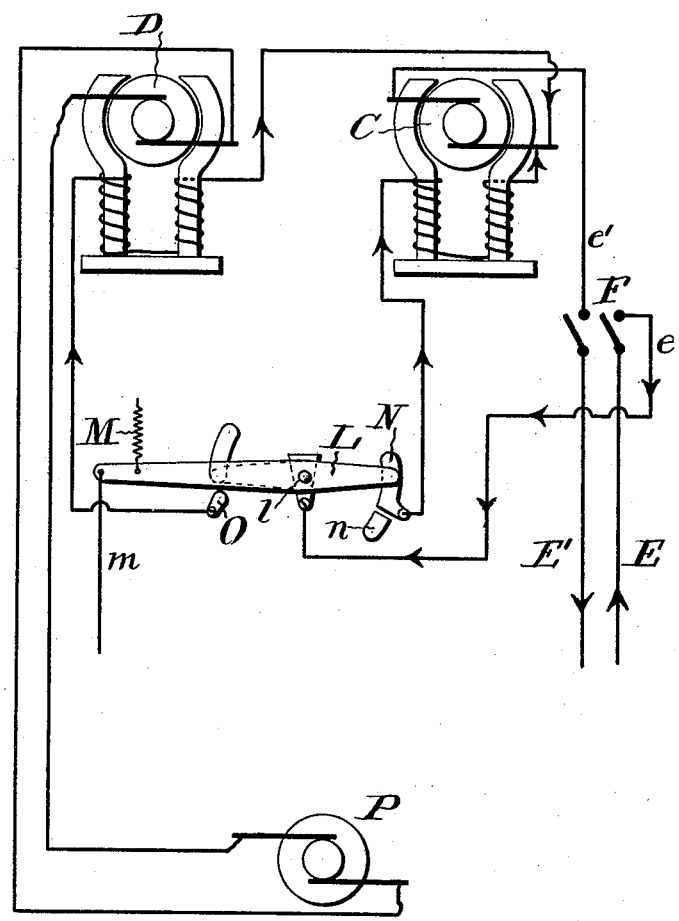

In the accompanying drawings which show a suitable embodiment of my invention, Figure 1 is a front elevation showing a box or case containing the high potential motor, the generator, a switch for automatically breaking all connection between the apparatus and the main lines, and a stopping and starting switch mechanism. Fig. 2 is a view showing the box in longitudinal vertical section, and a front elevation of the apparatus therein. Fig. 3 shows the box in transverse vertical section with the automatic switch mechanism therein shown in elevation. Fig. 4 is a diagrammatic view of the complete apparatus, without the box.

A case or box A for the apparatus is provided with a suitable hinged lid A' which, as shown, is of angular form so as, when opened, to expose the contents of the box from the top and front thereof. This box may be located in any suitable place, as, for instance, out of the way against a wall where it may be supported by brackets B B. Within the box is a high volt motor C and a low volt generator D driven mechanically thereby. The motor and generator are shown in Fig. 2 as mounted upon a common shaft $a$. The current enters by main line E and passes off by main line E', and electrical connection between the main lines and conductors $e\ e'$ for carrying the current to and from the motor is controlled by automatically acting switch mechanism F as follows: Knife-blade contacts $f f$ are pivoted to contact lugs $g\ g$ so as to rock into and out of engagement with contact clips $h\ h$, and an insulated cross bar G connecting the contacts $f f$, has connected it to a spring H which acts with a tendency to rock the contacts $f f$ into the position indicated by dotted lines in Fig. 3, and thus break connection with the contact clips $h\ h$. A switch actuating lever J having its fulcrum $k$ suitably supported by the box A, bears at one end against the under side of the cross bar G of the contacts $f\ f$, and at its opposite end is acted upon by a suitable attachment $k'$ of the box lid, which, when the lid is closed, moves the lever against the pull of the spring H into position to cause it to rock the contacts $f\ f$ into engagement with the contact clips $h\ h$ thus making connection between the main lines and the conductors $e\ e'$. It will be seen that the box lid cannot be opened without breaking the connection between the main lines and conductors $e\ e'$ and that the closing of the lid makes connection between said conductors and the main lines.

Switch mechanism by which to stop and start the motor C is provided as follows:—A contact lever L suitably fulcrumed by the pivot $l$ near one end is acted upon by a spring M the function of which is to hold the lever in operative position when allowed to do so. The lever is operated by hand in suitable way, as by the cord $m$ extending out from the box. On pulling this cord the long end of the switch lever is moved against the pull of the spring M so that the opposite end of the lever is moved from the insulating point $n$ and makes contact with the contact plate N, thus at first completing the circuit through the motor C as will readily be understood from inspection of Fig. 4, and the motor is started, assuming of course that the box lid is closed. By a further pull upon the cord the lever is brought into contact with contact plate O, thus bringing the field of the generator D into the high volt circuit in shunt with the field of the motor, the current through both fields passing through the armature of the motor. The generator is now ready to supply current of any voltage determined by its winding to a secondary motor P which may be located in any desired position convenient to the work for which it may be used. It will be plain that by means of the starting switch mechanism the high volt primary motor is started without any load on the generator, thus preventing the passage of an abnormally large current through the motor which might damage it. It will also be seen that in case the speed of the armature of the motor is reduced by a load on the generator, the counter electro-motive force of the armature being diminished, a larger current will be allowed to pass through the armature of the motor and necessarily through the fields of the motor and generator in circuit with it. That portion of the current which passes to the field of the generator will strengthen it, and so prevent a very large drop of voltage in the current generated in the generator, which lessening of voltage would otherwise be occasioned by the change in speed. That portion of the larger current which goes to the motor field strengthens it and so reduces its speed; but by so winding the fields of the motor and generator that the former shall be fully saturated while the latter is much below the point of saturation the effect of the increased current upon the speed of the motor is very slight. In case the current is taken from a grounded railroad circuit the main line E by which the connection is made with the fields of the motor and generator through the starting switch should be connected to the grounded line of said circuit. The object of so making the connection is to interpose the armature of the motor between the field coils, and the trolley wire of the railroad circuit. Thus the difference of potential between the current carried by the field coils and starting switch, and the ground, will be but a small percentage of the potential of the circuit, owing to the large drop of the potential through the armature of the motor.

It will be seen that by my invention there is insured perfect safety to the operator, with a high volt current, minimum variation of speed, impossibility of handling the high volt motor while the current is on, and means for starting the high volt motor in such manner as to protect it from over current.

I claim as my invention—

1. The combination of the primary series motor, the generator mechanically connected therewith, switch mechanism for starting the motor, and electrical connections, including said switch mechanism, between the motor armature and the field of the generator, actuated by the lever of the switch mechanism, after the motor is started, to charge the field of the generator by part of the current passing through the motor armature, substantially as set forth.

2. The combination of the primary series motor, the generator mechanically connected therewith, switch mechanism for starting the motor, electrical connections, including said switch mechanism, between the motor armature and the field of the generator, actuated by the lever of the switch mechanism, after the motor is started, to charge the field of the generator by part of the current passing through the motor armature, and the secondary motor operated by the current supplied by the generator, substantially as set forth.

3. The combination of the box, the motor mounted therein, electrical connections between the motor and the main lines, switch mechanism for making and breaking the connections between the motor and main lines, and the box lid by the opening and closing of which the electrical connections between the main lines and motor are broken and made, substantially as set forth.

In testimony whereof I have hereunto subscribed my name.

JOHN C. DAVIDSON.

Witnesses:
SEYMOUR CASE,
IRVING W. DECKER.